(12) United States Patent
Liu et al.

(10) Patent No.: US 11,537,615 B2
(45) Date of Patent: Dec. 27, 2022

(54) USING MACHINE LEARNING TO ESTIMATE QUERY RESOURCE CONSUMPTION IN MPPDB

(71) Applicant: Futurewei Technologies, Inc., Plano, TX (US)

(72) Inventors: Lei Liu, Santa Clara, CA (US); Mingyi Zhang, Santa Clara, CA (US); Yu Dong, San Jose, CA (US); Huaizhi Li, Belmont, CA (US); Yantao Qiao, Santa Clara, CA (US)

(73) Assignee: Futurewei Technologies, Inc., Addison, TX (US)

( * ) Notice: Subject to any disclaimer, the term of this patent is extended or adjusted under 35 U.S.C. 154(b) by 233 days.

(21) Appl. No.: 15/959,442

(22) Filed: Apr. 23, 2018

(65) Prior Publication Data

US 2018/0314735 A1 Nov. 1, 2018

Related U.S. Application Data

(60) Provisional application No. 62/492,706, filed on May 1, 2017.

(51) Int. Cl.
*G06F 16/00* (2019.01)
*G06F 7/00* (2006.01)
(Continued)

(52) U.S. Cl.
CPC ...... *G06F 16/24545* (2019.01); *G06F 16/283* (2019.01); *G06F 17/16* (2013.01);
(Continued)

(58) Field of Classification Search
CPC .......... G06F 16/24542; G06F 16/2453; G06F 16/2471; G06F 16/24545; G06F 16/283;
(Continued)

(56) References Cited

U.S. PATENT DOCUMENTS

| | | | |
|---|---|---|---|
| 2004/0172378 A1* | 9/2004 | Shanahan | G06F 16/337 |
| 2010/0082599 A1* | 4/2010 | Graefe | G06F 16/217 |
| | | | 707/713 |

(Continued)

FOREIGN PATENT DOCUMENTS

| | | |
|---|---|---|
| CN | 102362276 A | 2/2012 |
| CN | 105183850 A | 12/2015 |
| CN | 105279286 A | 1/2016 |

OTHER PUBLICATIONS

Machine Translation and Abstract of Chinese Publication No. CN105279286, Jan. 27, 2016, 10 pages.
(Continued)

*Primary Examiner* — Raquel Perez-Arroyo
(74) *Attorney, Agent, or Firm* — Conley Rose, P.C.

(57) ABSTRACT

Methods and apparatus are provided for using machine learning to estimate query resource consumption in a massively parallel processing database (MPPDB). In various embodiments, the machine learning may jointly perform query resource consumption estimation for a query and resource extreme events detection together, utilize an adaptive kernel that is configured to learn most optimal similarity relation metric for data from each system settings, and utilize multi-level stacking technology configured to leverage outputs of diverse base classifier models. Advantages and benefits of the disclosed embodiments include providing faster and more reliable system performance and avoiding resource issues such as out of memory (OOM) occurrences.

16 Claims, 8 Drawing Sheets

(51) Int. Cl.
  *G06F 16/2453* (2019.01)
  *G06F 17/16* (2006.01)
  *G06N 5/04* (2006.01)
  *G06N 20/00* (2019.01)
  *G06F 16/28* (2019.01)
  *G06N 20/10* (2019.01)

(52) U.S. Cl.
  CPC ............... *G06N 5/04* (2013.01); *G06N 20/00* (2019.01); *G06N 20/10* (2019.01)

(58) Field of Classification Search
  CPC ........ G06F 17/16; G06N 20/00; G06N 20/10; G06N 5/04
  USPC .......................................................... 707/718
  See application file for complete search history.

(56) References Cited

U.S. PATENT DOCUMENTS

| | | | | |
|---|---|---|---|---|
| 2010/0114865 | A1* | 5/2010 | Gupta | G06F 16/217 707/E17.017 |
| 2010/0257154 | A1 | 10/2010 | Pendap et al. | |
| 2012/0246158 | A1 | 9/2012 | Ke et al. | |
| 2013/0185730 | A1* | 7/2013 | Baruch | G06F 9/5027 718/104 |
| 2014/0372356 | A1 | 12/2014 | Bilal et al. | |
| 2015/0286684 | A1* | 10/2015 | Heinz | G06F 16/24549 707/769 |
| 2016/0128083 | A1* | 5/2016 | Shakya | H04W 72/0446 455/406 |
| 2016/0188594 | A1* | 6/2016 | Ranganathan | G06F 9/5066 707/769 |
| 2016/0217003 | A1* | 7/2016 | Ailamaki | G06F 9/505 |
| 2018/0157978 | A1* | 6/2018 | Buda | G06F 16/2455 |

OTHER PUBLICATIONS

Foreign Communication From A Counterpart Application, PCT Application No. PCT/CN2018/084464, English Translation of International Search Report dated Jul. 27, 2018, 4 pages.

Hotelling, H., 1936: Relations between two sets of variants, Biometrika, 28, 321-377.

Archana Sulochana Ganapathi, "Predicting and Optimizing System Utilization and Performance via Statistical Machine Learning," Technical Report No. UCB/EECS-2009-181, http://www.eecs.berkeley.edu/Pubs/TechRpts/2009/EECS-2009-181.html, Dec. 17, 2009 111 pages.

Bach, et al., "Kernel Independent Component Analysis," Journal of Machine Learning Research 3 (2002), Jul. 2002, pp. 1-48.

Mehta, A., et al., "Automated Workload Management for Enterprise Data Warehouses", XP055658091, IEEE Data Engineering Bulletin, vol. 31, Mar. 1, 2008, 10 pages.

Pavlo, A., et al., "Self-Driving Database Management Systems", XP055612820, 8th Biennial Conference on Innovative Data Systems Research CIDR 2017, Jan. 11, 2017, 6 pages.

Foreign Communication From A Counterpart Application, European Application No. 18794005.1, Extended European Search Report dated Jan. 23, 2020, 12 pages.

* cited by examiner

USING MACHINE LEARNING TO ESTIMATE QUERY RESOURCE CONSUMPTION IN MPPDB

CROSS-REFERENCE TO RELATED APPLICATIONS

This application claims priority to U.S. Provisional Patent Application No. 62/492,706, filed May 1, 2017 by Lei Liu and titled "Using Machine learning to Estimate Query Resource Consumption in MPPDB," which is incorporated by reference.

TECHNICAL FIELD

Embodiments of the present disclosure relate to the field of machine learning, and in particular, to a method and an apparatus for using machine learning to estimate query resource consumption in a massively parallel processing database (MPPDB).

BACKGROUND

Machine learning is an application of artificial intelligence (AI) that provides systems the ability to automatically learn and improve from examples, data sets, direct experience, or instructions without being explicitly programmed. The primary aim is to allow the computers to learn automatically without human intervention or assistance and adjust actions accordingly.

SUMMARY

According to one aspect of the present disclosure, there is provided a method that includes receiving a query from a client device; generating a query plan for the query by parsing the query to determine operators of the query and a sequence of the operators; performing a query resource consumption estimation for the query based on the query plan using a predictive trained model generated using a machine learning technology that automates analytical model building; determining whether a currently available system resource is sufficient to initiate execution of the query based on the query resource consumption estimation of the query; initiating execution of the query in response to a determination that the currently available system resource is sufficient for executing the query based on the query resource consumption estimation of the query; receiving a result of the query after execution of the query is completed; and returning the result of the query to the client device.

Optionally, in any of the preceding aspects the method further includes executing the query based on a concurrency query execution plan in response to a determination that the currently available system resource is insufficient for initiating execution of the query based on the query resource consumption estimation of the query.

Optionally, in any of the preceding aspects the method further includes reducing the currently available system resource by the query resource consumption estimation for the query in response to initiating execution of the query.

Optionally, in any of the preceding aspects the method further includes increasing the currently available system resource by the query resource consumption estimation for the query in response to completing execution of the query.

Optionally, in any of the preceding aspects, the process of generating the query plan for the query includes parsing the query into an execution hierarchical tree, where each tree node of the execution hierarchical tree represents an operator.

Optionally, in any of the preceding aspects the method further includes determining a number of instances each operator appears in the query and a sum of cardinalities for each instance of the operator.

Optionally, in any of the preceding aspects, another implementation of the aspect provides that the machine learning technology utilizes an adaptive kernel that is configured to learn different kernel metrics to various system settings and data.

Optionally, in any of the preceding aspects, another implementation of the aspect provides that the machine learning technology utilizes multi-level stacking technology configured to leverage outputs of diverse base classifier models.

Optionally, in any of the preceding aspects, another implementation of the aspect provides that the machine learning technology jointly performs query resource consumption estimation for a query and resource extreme events detection together.

Optionally, in any of the preceding aspects the method further includes placing the query into a query execution queue in response to a determination that the currently available system resource is insufficient for initiating execution of the query based on the query resource consumption estimation of the query.

According to a second aspect of the present disclosure, there is provided a query management device that includes a network communication interface configured to enable communication over a network a memory storage comprising instructions; and one or more processors in communication with the network communication interface and to the memory, wherein the one or more processors execute the instructions to: receive a query from a client device; generate a query plan for the query by parsing the query to determine operators of the query and a sequence of the operators; perform a query resource consumption estimation for the query based on the query plan using a predictive trained model generated using a machine learning technology that automates analytical model building; determine whether a currently available system resource is sufficient to initiate execution of the query based on the query resource consumption estimation of the query; initiate execution of the query in response to a determination that the currently available system resource is sufficient for executing the query based on the query resource consumption estimation of the query; receive a result of the query after execution of the query is completed; and return the result of the query to the client device.

Optionally, in any of the preceding aspects, a further implementation of the query management device provides that the processing unit executes the query based on a concurrency query execution plan in response to a determination that the currently available system resource is insufficient for initiating execution of the query based on the query resource consumption estimation of the query.

Optionally, in any of the preceding aspects, a further implementation of the query management device provides that the processing unit executes the executable instructions to reduce the currently available system resource by the query resource consumption estimation for the query in response to initiating execution of the query.

Optionally, in any of the preceding aspects, a further implementation of the query management device provides that the processing unit executes the executable instructions to increase the currently available system resource by the query resource consumption estimation for the query in response to completing execution of the query.

Optionally, in any of the preceding aspects, a further implementation of the query management device provides that the process of generating the query plan for the query includes parsing the query into an execution hierarchical tree, where each tree node of the execution hierarchical tree represents an operator.

Optionally, in any of the preceding aspects, a further implementation of the query management device provides that the processing unit executes the executable instructions to determine a number of instances each operator appears in the query and a sum of cardinalities for each instance of the operator.

Optionally, in any of the preceding aspects, a further implementation of the query management device provides that the machine learning technology utilizes an adaptive kernel that is configured to learn different kernel metrics to various system settings and data.

Optionally, in any of the preceding aspects, a further implementation of the query management device provides that the machine learning technology utilizes multi-level stacking technology configured to leverage outputs of diverse base classifier models.

Optionally, in any of the preceding aspects, a further implementation of the query management device provides that the machine learning technology jointly performs query resource consumption estimation for a query and resource extreme events detection together.

It should be understood that embodiments of this disclosure further include all combinations of the items discussed above.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
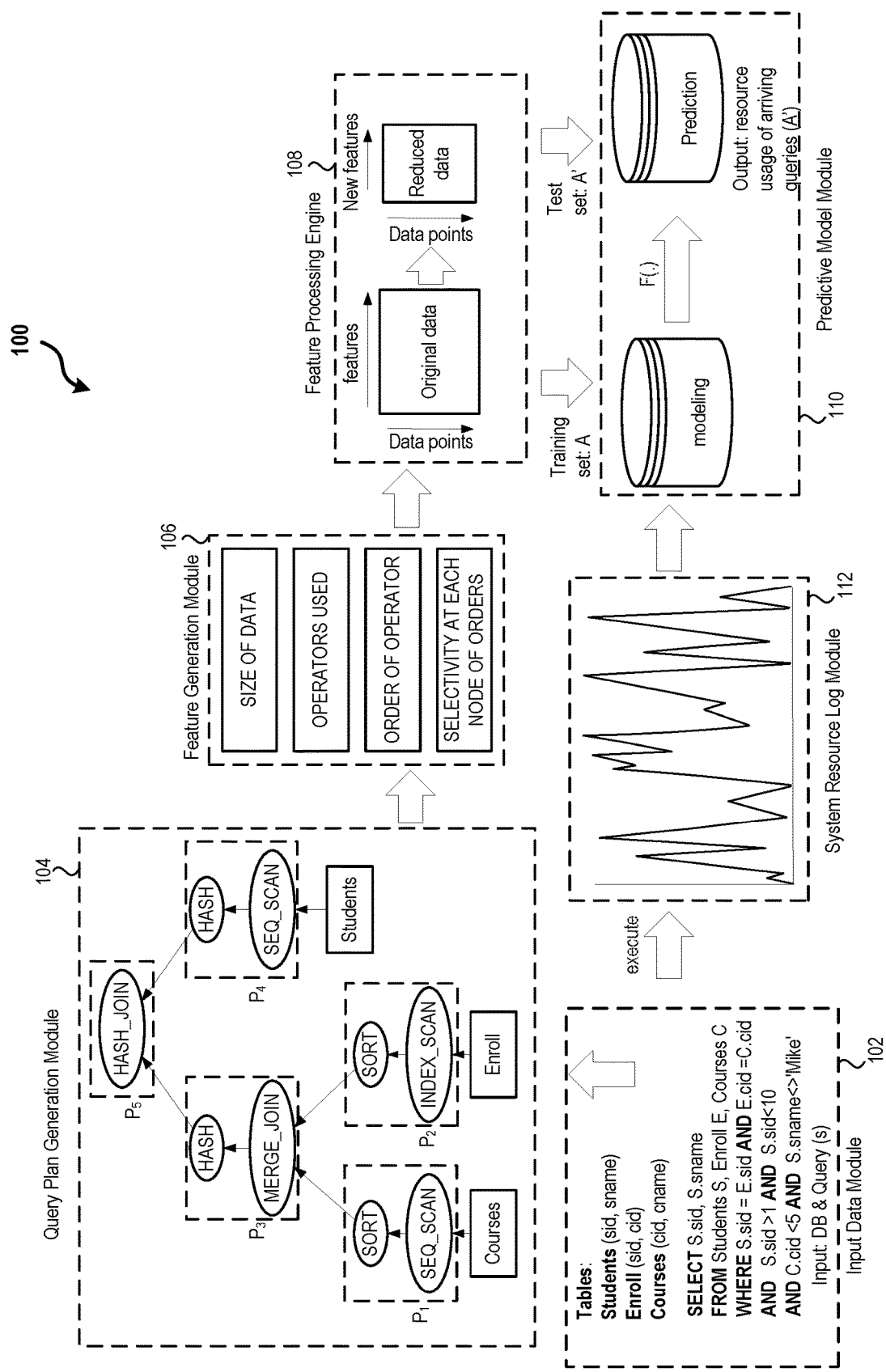
FIG. 1 is a schematic diagram illustrating a high level system architecture of a co-prediction machine learning system in accordance with an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method of using machine learning to estimate query resource consumption in a MPPDB. A MPPDB is a database management system that partitions data across multiple servers or nodes for enabling queries to be split into a set of coordinated processes that are executed in parallel on the one or more nodes to achieve faster results. A system resource is a component that provides certain capabilities and contributes to the overall system performance. Non-limiting examples of system resources include system memory, cache memory, hard disk space, a central processing unit (CPU), and input/output (I/O) channels. The disclosed embodiments comprise a workload management (WLM) component that uses innovative machine learning techniques to estimate query resource costs. As a result, query concurrency levels and system resource utilization are improved. In addition, resource extreme events such as, but not limited to, out of memory (OOM) occurrences are avoided.

In current large database management systems, such as Huawei's Gauss200 On-Line Analytical Processing (OLAP) Data Warehouse systems, queries may be complex. An execution time range of the queries may be from seconds to hours (or even to days). The long-running queries may require the use of resource-intensive operators, such as sort and/or hash-join. The operators use resources to sort their input data and/or to join their data sets. The amount of resources allocated to the operators affects the performance of the query such as, for example, the elapsed time. Typically, the larger the resource space that is assigned, the better performance the query achieves. However, there are only limited resources available in a computer system, and the resource is shared by all concurrent queries (and operators). Therefore, a challenge for the database system is to design an effective strategy to manage query concurrency levels given limited system resources. However, effectively managing query concurrency levels may be an extremely difficult task because it is not easy to accurately estimate query resource consumption with current technologies.

As an example, suppose that the available memory of a computer system running a Gauss200 OLAP Data Warehouse system is 64 gigabytes (GB) and that three queries, Q1, Q2, and Q3, arrive at the system one after the other. With current technology, the estimated memory cost of each of the three queries is 20 GB (i.e., <Q1, 20 GB>, <Q2, 20 GB> and <Q3, 20 GB>). Q1 is admitted into the database system first and starts executing because its memory cost is 20 GB, which is less than the system's current available memory of 64 GB. Thus, the query is accommodated. When Q1 starts executing, the system's current available memory is reduced to 44 GB. In one embodiment, the memory bookkeeping is handled by a workload manager, e.g., a WLM component, in the database system. After being admitted in the database system, Q2 and Q3 start executing as the current available memory of the computer system is 44 GB, which is sufficient for Q2, <Q2, 20 GB>, and Q3, <Q3, 20 GB>, and system is estimated to still have 4 GB left after execution of these three queries. However, in reality, an OOM issue may still occur in the system. The reason is that the estimated memory consumption is not accurate. For example, if each of the three queries consumed 24 GB of memory, instead of the estimated 20 GB, an OOM occurs because the actual required memory is 72 GB, which is greater than the available 64 GB of memory. This OOM issue could be avoided if the estimated resource consumption was accurate. For instance, if the estimated memory consumption for Q1, Q2, and Q3 were accurately estimated to be 24 GB, the system could initiate execution of Q1 as the system's current available memory is 64 GB. The system could also initiate execution of Q2 as the system's current available memory is 40 GB after accounting for Q1, which is greater than the estimated memory consumption for Q2. After accounting for both Q1 and Q2, the system's current available memory is 16 GB, which is not sufficient to execute Q3. The system places Q3 in an execution queue until the system's current available memory is sufficient to execute Q3. Thus, OOM is avoided due to accurately estimating the memory consumption for each of the queries.

In certain alternative embodiments, the WLM component may be configured to only execute a query if executing the query based on its estimated resource consumption does not reduce the available system resource beyond a particular threshold. For example, the WLM may be configured to try and maintain at least 4 GB of available system memory at all times just in case a particular query or other system process exceeds expected memory consumption. Thus, the threshold enables the WLM to maintain a cushion or buffer to prevent OOM from occurring. In these embodiments, the WLM may still queue a query for execution even if the available system memory (e.g., 20 GB) is sufficient to execute a query that has a query resource consumption estimation of 20 GB to prevent the possibility of OOM occurring.

As shown above, it is beneficial to accurately estimate resource consumption or other system resources for query concurrency level management. However, current technologies that try to estimate resource consumption have at least four limitations. First, most technologies focus on utilization estimation only, and fail to have the capability to discover the resource extreme events. Second, most technologies focus on utilization predictive, and fail to consider the mutual benefits of learning the tasks of resource consumption and abnormal resource usage (e.g., extreme events). Third, data from a real-world application is usually non-linear separable. Current technology usually uses a standard kernel method such as radial basis function (RBF), or a polynomial kernel for non-linear tasks. However, each of these standard kernel methods have a strong data distribution assumption. In addition, there is no adaptive kernel or distance metric for given queries in different system settings. Fourth, directly deploying existing machine learning technologies to query resource consumption estimation is sensitive to the problem of overfitting and concept drift, especially when there is noise in the data.

Accordingly, in the present disclosure, several embodiments are disclosed that leverage advanced machine learning technologies that automates analytical model building to achieve better system resource estimation by addressing one or more of the above limitations in current technologies. In one embodiment, the disclosed embodiments may be used for managing query concurrency control in MPPDB. It should be noted that although the present disclosure uses the example of memory estimation in MPPDB, the disclosed technology may be extended to estimate other types of system resource consumption. The technology may also be applied to other database systems.

In various embodiments of the present disclosure, a database management system is configured to perform the tasks of (1) estimating resource utilization and (2) resource extreme event discovery. As discussed above, in various embodiments, estimating resource utilization plays a role in query concurrent level management. Additionally, resource extreme event discovery is important as it may directly lead to OOM and a system crash. Thus, these two tasks are related. For example, if the resource consumption in the given unit is a high value, it has a higher probability to be an extreme event. On the other hand, if a time unit corresponds to low resource consumption, it has a lower chance to be an extreme event. Based on this observation from real-world data management systems, a machine learning model, which has the capability to jointly learn the models of both query resource consumption estimation and extreme events discovery, is provided in the present disclosure.

As opposed to existing systems, the disclosed embodiments accurately estimate resource cost as well as detect extreme resource events, which are meaningful as they lead to OOM and/or a system crash. Jointly modeling these two related tasks leverages information from each other, and achieves better performance by mutually benefiting each other during the training phase.

FIG. 1 is a schematic diagram illustrating a high level system architecture of a co-prediction machine learning system 100 for performing query resource consumption estimation and resource extreme events detection in accordance with an embodiment of the present disclosure. In one embodiment, the co-prediction machine learning system 100 jointly performs query resource consumption estimation and resource extreme events detection together or simultaneously as they may provide mutual benefit to each other during the model training phase. The co-prediction machine learning system 100 may be generalized and work with any base machine learning technologies. The co-prediction machine learning system 100 provides an adaptive kernel learning method, which has the capability of learning the appropriate similarity or distance metric automatically for any given data and system setting. To solve the problem of over-fitting and concept drift, the co-prediction machine learning system 100 provides a robust machine learning prediction system with stacking techniques. The co-prediction machine learning system 100 achieves several innovative objectives including predicting the query resource costs when/before the system starts executing, predicting the possible extreme resource events as well as their occurrence time points, improving query concurrency level while controlling resource contention, and improving system performance and resource utilization while avoiding severe performance problems, such as OOM and system crashes.

In the depicted embodiment, the co-prediction machine learning system 100 includes an input data module 102, a query plan generation module 104, a feature generation module 106, a feature processing engine 108, a predictive model module 110, and a system resource log module 112. In one embodiment, the input data module 102 includes a tracked database (DB), a set of queries, and system logs of both actual resource cost and peak value if there is any at each time unit. The input queries and database may, for example, be a relational or a non-structured query language (NoSQL) database, such as Neo4j or Titan for graph database. As stated above, although the disclosed embodiments discuss memory resource consumption estimation as a given example in the present disclosure, the co-prediction machine learning framework may easily be used to estimate other system resource consumption tasks.

As illustrated in FIG. 1, the input queries are forwarded to the query plan generation module 104, which generates query operation plans using a DB optimizer. For example, in one embodiment, the query plan generation module 104 is responsible for generating the query plan (e.g., operators and their sequential relations) for the input queries using a query optimizer of the data management system. In one embodiment, once the queries are submitted to a database server, and parsed by the parser, the parsed queries are then passed to the query optimizer, which may be guided with hints, to determine the most efficient way to execute a given query by considering the possible query plan. The query plan generation module 104 may select a best query plan. The selected query plan, in a form of an ordered set of operators used to access data in a database system, is then forward to the feature generation module 106.

The feature generation module 106 is responsible for generating a set of feature representation of each query for modeling purposes that may be helpful for understanding resource cost. In one embodiment, for each input query, a set of features to represent is extracted. As an example, the feature generation module 106 may consider the size of data, operators used in a query plan, orders/sequences of operators, and the selectivity at each operator in a query plan. In other embodiments, other types of DB features may also be considered. The features extracted from the queries are then passed to the feature processing engine 108.

In certain embodiments, the feature processing engine 108 is may be used to further prepare the feature set extracted by the feature generation module 106 as the features generated from feature generation module 106 may not be clean. For example, the features may include duplicate information, noise features, or too high dimension are used. In one embodiment, the feature processing engine 108 performs dimension reduction and kernel learning to enhance the quality of feature representation. The present disclosure may work with any types of feature extraction and/or feature reduction technologies, such as Principal Component Analysis (PCA), Probabilistic latent semantic indexing (PLSI), Latent Dirichlet allocation (LDA), and so on.

The system resource log module 112 is used to capture the labels (e.g., resource utilization and peak values) from historical data for training purposes. In one embodiment, the system resource log module 112 is responsible for pre-processing the input system logs and generating labels for both tasks. The pre-processing work may include removing background noise, extracting the peak values, and using resource utilization from system logs for training purposes.

The predictive model module 110 is configured to train the co-predictive model to generate a predictive trained model. In one embodiment, given the predictive trained model and arriving queries without execution, the predictive model module 110 outputs the estimated resource cost and detected peak values (extreme event), if any, at each time unit. The details of each component are discussed below.

Figure 2:
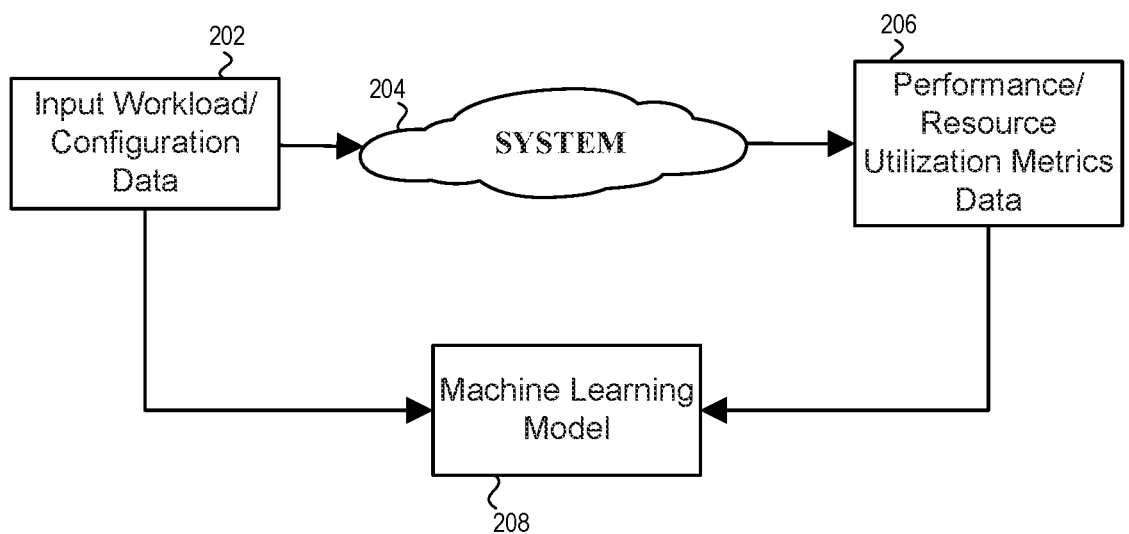
FIG. 2 is a schematic diagram illustrating a simplistic view using machine learning for estimating system resource utilization tasks in accordance with an embodiment of the present disclosure.

FIG. 2 is a schematic diagram illustrating a simplistic view using machine learning for estimating system resource utilization tasks in accordance with an embodiment of the present disclosure. In the depicted embodiment, a machine learning model 208 may be employed to receive input workload and configuration data 202 of a system 204. The machine learning model 208 is also configured to receive performance and resource utilization metrics data 206 of the system 204 given the input workload and configuration data 202 processed by the system 204. In one embodiment, the machine learning model 208 is configured to perform auto-extraction to identify the relationships between the input workload and configuration data 202 and the measured performance and resource utilization metrics data 206.

The machine learning model 208 may be configured to use various machine learning technologies for resource estimation in data management systems such as, but not limited to, regression, Canonical Correlation Analysis (CCA), and Kernel Canonical Correlation Analysis (KCCA). Regression is the simplest machine learning technique with a sound statistical basis. The disclosed embodiments may utilize a single variable regression or a multi-variate regression to predict each performance metric of interest. For example, in one embodiment, using multivariate regression to predict each performance metric of interest, independent variables $x1, x2, \ldots, xn$ are defined for each workload feature and each performance metric is treated as a separate dependent variable y. In one embodiment, the goal of regression is to solve the equation $a1x1+a2x2+ \ldots +anxn=y$ for the coefficients ai. One issue with using regression is that generating a regression curve per dependent variable makes it difficult to account for interdependencies among the various dependent variables. CCA is a method for exploring the relationships between two multivariate sets of variables (vectors). For example, CCA considers pair-wise datasets and finds dimensions of maximal correlation across both datasets. One issue with CCA is that it does not have a notion of similarity between the instances being correlated and it is unable to identify which known workload instances are qualitatively similar to an unknown instance. KCCA is a variant of CCA that captures similarity using a kernel function. Given two multivariate datasets, KCCA computes basis vectors for subspaces in which the projections of the two datasets are maximally correlated. The correlation analysis is on pairwise distances, not the raw data itself. This approach provides much more expressiveness in capturing similarity and its correlations can then be used to quantify performance similarity of various workloads. Additional details regarding these techniques are discussed in Archana Sulochana Ganapathi, "Predicting and Optimizing System Utilization and Performance via Statistical Machine learning," Ph.D thesis, UC Berkeley Dec. 17, 2009; Hotelling, H., 1936: "Relations between two sets of variants," Biometrika 28, 321-377; and Bach, F. R. and M. I. Jordan (2002), "Kernel independent component analysis," Journal of Machine learning Research 3, 1-48, which are incorporated herein by reference. In the below description, the present disclosure will describe an embodiment of the machine learning model 208 utilizing KCCA, however as noted above, the disclosed embodiments may use various machine learning technologies for resource estimation in data management systems.

Figure 3:
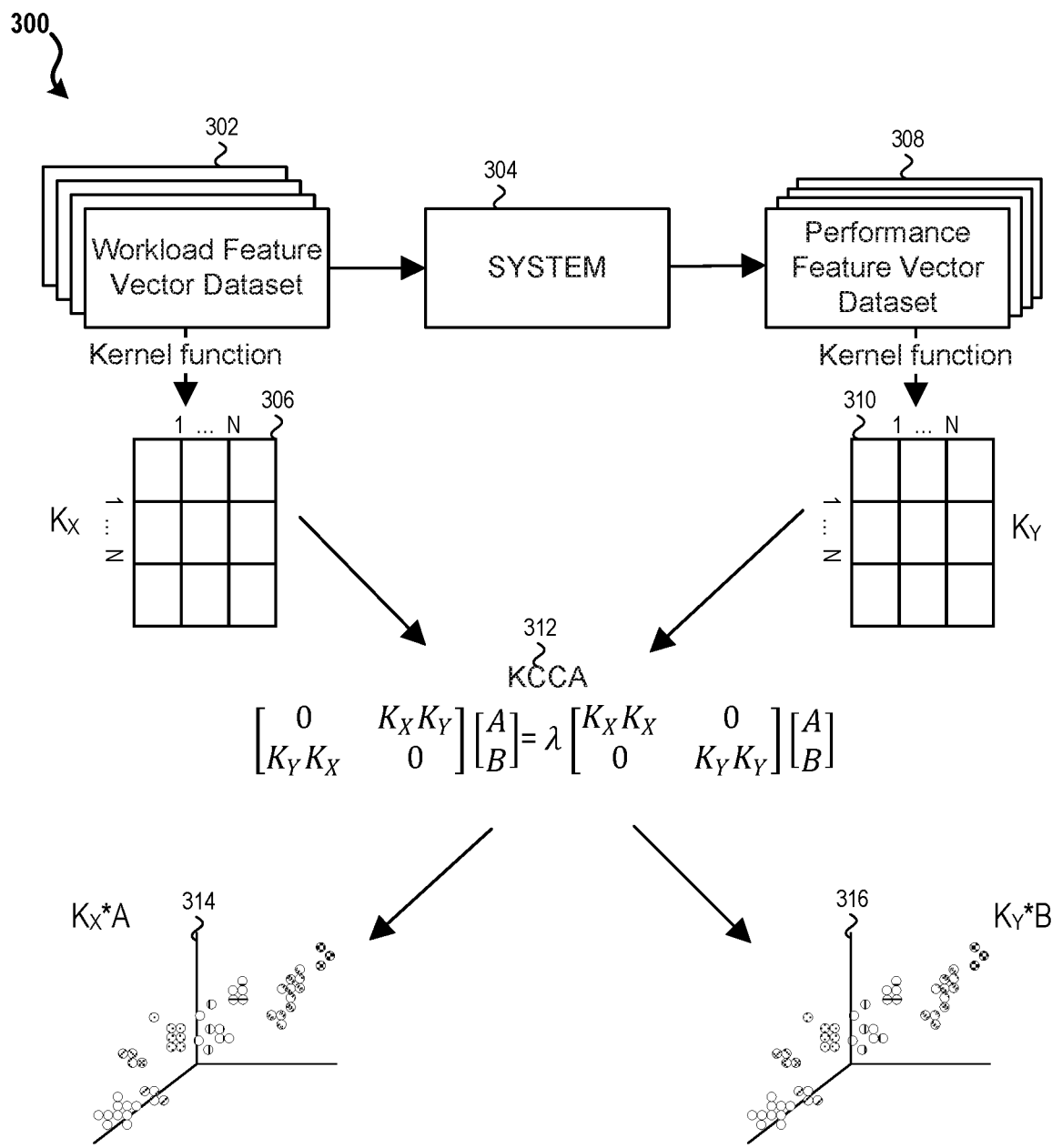
FIG. 3 is a schematic diagram illustrating a predictive ML process in accordance with an embodiment of the present disclosure.

FIG. 3 is a schematic diagram illustrating a predictive ML process 300 in accordance with an embodiment of the present disclosure. In particular, FIG. 3 illustrates the transformation predictive ML process 300 imposes on a workload feature vector dataset 302 and a performance feature vector dataset 308. In one embodiment, the predictive ML process 300 first creates the workload feature vector dataset 302 for all workloads of a system 304. The performance feature vector dataset 308 is constructed for each corresponding observation of system resource utilization and performance of the system 304 based on the given workload. In one embodiment, the predictive ML process 300 uses a query plan to generate the workload feature vector dataset 302 (denoted as xk). The predictive ML process 300 may construct the performance feature vector dataset 308 (denoted yk) from system performance logs. Each workload feature vector xk has a corresponding performance feature vector yk. The set of workload feature vectors (xk) and corresponding performance feature vectors (yk) may be denoted as {(xk, yk): k=1, . . . , N}.

As illustrated in FIG. 3, the workload feature vector dataset 302 and the performance feature vector dataset 308 are inputted into a kernel function that respectively generates a kernel matrix Kx 306 and a kernel matrix Ky 310. The kernel function is an algorithm that computes an inner product in feature space between two vector arguments. Non-limiting examples of kernel functions that may be employed in the disclosed embodiments include, but are not limited to, Gaussian, polynomial, linear, spline, anova RBF, Bessel, Laplacian, and hyperbolic tangent. In one embodiment, the predictive ML process 300 projects the feature vector xk of the workload feature vector dataset 302 and performance feature vector yk of the performance feature vector dataset 308 onto dimensions 314, 316 of maximal correlation across the data sets by applying a KCCA algorithm 312 that takes the kernel matrices Kx 306 and Ky 310 and solves the following generalized eigenvector problem:

$$\begin{bmatrix} 0 & K_X K_Y \\ K_Y K_X & 0 \end{bmatrix} \begin{bmatrix} A \\ B \end{bmatrix} = \lambda \begin{bmatrix} K_X K_X & 0 \\ 0 & K_Y K_Y \end{bmatrix} \begin{bmatrix} A \\ B \end{bmatrix}$$

where Kx represents the pairwise similarity kernel matrix of workload feature vector x, where Ky represents the pairwise similarity kernel matrix of performance feature vector y, where A represents a matrix consisting of the basis vectors of a subspace onto which Kx may be projected, and where B represents a matrix consisting of basis vector of a subspace onto which Ky may be projected, such that Kx*A and Ky*B are maximally correlated. Kx*A is the workload projection and Ky*B is the performance projection.

As depicted in FIG. 3, seemingly dissimilar points in the raw input space may end up clustering together in the projections due to correlation maximization that spans both datasets. The projection resulting from the predictive ML process 300 provides two key properties, namely the dimensionality of the raw datasets is reduced based on the number of useful correlation dimensions, and corresponding data points in both projections are collocated. Thus, there is a clustering effect that preserves neighborhoods across projections. In the depicted embodiment, the predictive ML process 300 computes basis vectors for subspaces, given two multivariate datasets, workload feature vector dataset 302 and performance feature vector dataset 308, in which the projections of the two datasets are maximally correlated. This procedure finds subspaces in the linear space spanned by the eigen-functions of the kernel functions such that projections onto these subspaces are maximally correlated. Once A and B is learned, for any given queries, a query plan feature vector is conducted to find the nearest neighbors of queries in the training set, and use the average system performance of these nearest neighbors to predict the performance vector for this test query. Although the predictive ML process 300 uses KCCA, in various embodiments, other types of predictive ML algorithms may be used such as, but not limited to, deep neural network, long short-term memory (LSTM), recurrent neural network (RNN), support vector machine (SVM), decision tree, and XGradient Boosting (XGBoosting).

Figure 4:
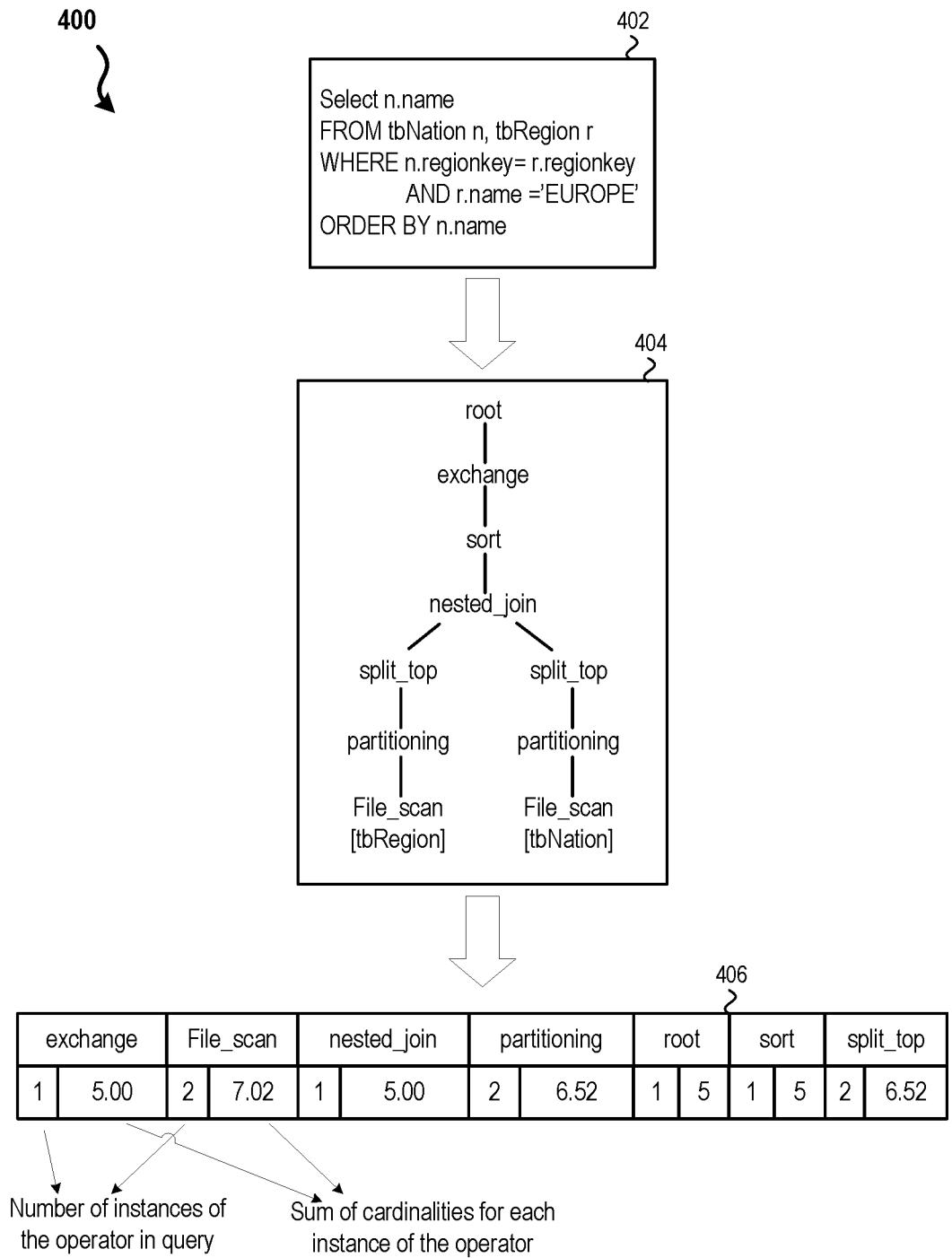
FIG. 4 is a schematic diagram illustrating a process for generating a query plan feature vector in accordance with an embodiment of the present disclosure.

FIG. 4 is a schematic diagram illustrating a process 400 for generating a query plan feature vector in accordance with an embodiment of the present disclosure. In one embodiment, the process 400 may be used by the predictive ML process 300 to generate the feature vector xk. As depicted in FIG. 4, the process 400 receives a query at block 402. The query specifies what is to be selected (e.g., SELECTED n.name), from where (e.g., FROM tbNation n, tbRegion r), the conditions for selection (e.g., WHERE n.regionkey=r.regionkey AND r.name='EUROPE') and the order to return the selected data (e.g., ORDER BY n.name). The process 400 at block 404 parses the query down into its operators to produce a query plan. An operator is a reserved word or a character used in a query to perform operation(s), such as comparisons and arithmetic operations. An operator may be used to specify a condition or to serve as conjunctions for multiple conditions in a statement. The process 400 at block 406 generates a query plan feature vector that includes each the number of instances each operator appears in the query and the sum of cardinalities for each instance of the operator. In one embodiment, the sum of cardinalities indicates the actual data size to be process corresponding to an operator. For example, if a sort operator appears twice in a query plan with cardinalities 3000 and 45000, the query plan feature vector includes a "sort instance count" element containing the value 2 and a "sort cardinality sum" element containing the value 48000.

Figure 5:
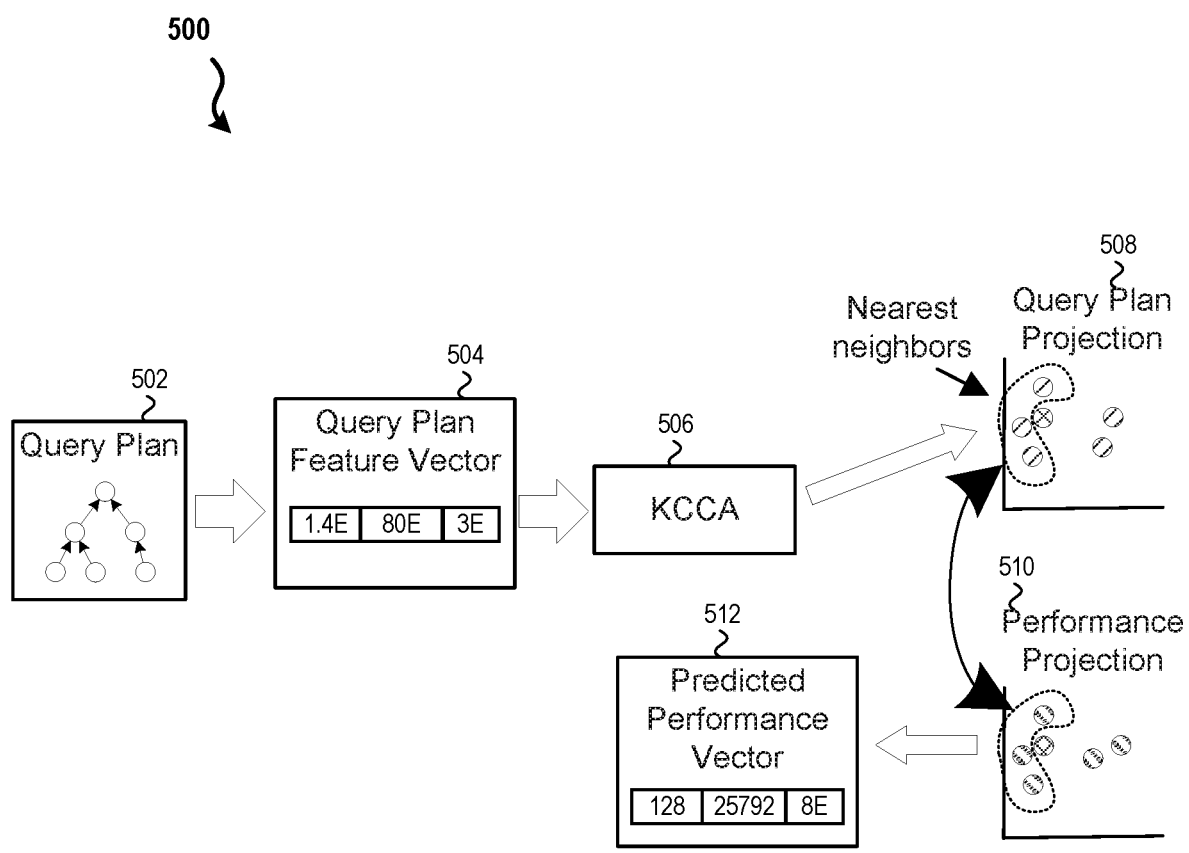
FIG. 5 is a schematic diagram illustrating a process for predicting the workload in accordance with an embodiment of the present disclosure.

FIG. 5 is a schematic diagram illustrating a process 500 for predicting the workload in accordance with an embodiment of the present disclosure. The process 500 begins with a query plan 502 for a query. The query plan 502 may be generated using the query plan generation module 104 as described in FIG. 1. The query plan 502 is used to generate a query plan feature vector 504 as shown in the process 400 described in FIG. 4. The query plan feature vector 504 is included in a feature vector dataset that includes the query plan feature vector of other queries for enabling query concurrency management. The process 500 applies the feature vector dataset of the query to KCCA process 506 to find the nearest neighbors of queries in the training set as shown in query plan projection 508. The process 500 then correlates the nearest neighbors of queries in the training set to their performance projection 510. In one embodiment, the process 500 uses the average system performance of these nearest neighbors to generate the predicted performance vector 512 for the query.

As stated above, one innovative feature of the disclosed embodiments is the use of joint modeling to jointly detect the resource extreme events and predict the resource consumption. In one embodiment, the joint modeling is performed by a single machine learning model. In alternative embodiments, two machine learning models may be trained, one for resource consumption and the other for extreme events detection. However, in one embodiment, by performing joint modeling for predicting resource consumption and resource usage extreme events simultaneously, additional information may be gleaned to provide higher accuracy in predicting resource consumption and resource usage extreme events. For example, if these tasks were to be performed separately, each task may be modeled independently using least squares SVM (LS-SVM) as a base model for the above two tasks. The independent model for utilization estimation may be represented by the following equation:

$$\min_{w_u,b_u,e,\beta} \mathcal{L}_u = \frac{1}{2}W_u^T W_u + \frac{1}{2}\gamma_1 \sum_i e_i^2 - \sum_i \beta_i\{y_i^{[u]}[w_u^T x_i^{[u]} + b_u] - 1 + \varepsilon_i\}$$

where $\mathcal{L}_u$ is the objective target that is minimize via optimization, $W_u$ stands for weight matrix of resource utilization, $e_i$ is the error for $i^{th}$ resource utilization prediction in model training, $x_i$ is the $i^{th}$ query in training set, $y_i$ is the resource utilization that is associated with the $i^{th}$ query in training set, and $b_u$, e, β are all parameters of models for resource utilization prediction.

The independent model for extreme events detection may be represented by the following equation:

$$\min_{w_p,b_p,e,\alpha} \mathcal{L}_p = \frac{1}{2}W_p^T W_p + \frac{1}{2}\gamma_2 \sum_i e_i^2 - \sum_i \alpha_i\{y_i^{[p]}[w_p^T x_i^{[p]} + b_p] - 1 + \varepsilon_i\}$$

where $\mathcal{L}_p$ is the objective target that is minimize via optimization, $W_p$ stands for weight matrix of resource peak value (extreme event) detection, $e_i$ is the error for $i^{th}$ resource peak value prediction in model training, $x_i$ is the $i^{th}$ query in training set, and $y_i$ is the resource peak value if there is any (0/1) that associate with $i^{th}$ query in training set. $b_u$, e, β are all parameters of models for resource peak value prediction.

The disclosed embodiments recognize certain drawbacks of independent modeling that includes overlooking the informative information between these two tasks. For example, when a data instance is predicted with a high cost of resource, it has a higher probability to be the extreme event compared against the lower one. Additionally, when a data instance is predicted as an extreme event, it is more likely to be a query with high volume of resource cost. Accordingly, the disclosed embodiments apply an innovative approach for predicting resource consumption and resource usage extreme events simultaneously. Thus, before a set of queries is executed, the disclosed embodiments will predict both (1) resource utilization and (2) any extreme event at each time unit.

A non-limiting example using the co-prediction model, with LS-SVM as base technology may be represented by the following equation:

$$\min_{w_u,b_u,e,\beta w_p,b_p,e,\alpha} \mathcal{L}_u = \frac{1}{2}W_p^T W_p + \frac{1}{2}\gamma_2 \sum_i e_i^2 +$$

$$\frac{1}{2}W_u^T W_u + \frac{1}{2}\gamma_1 \sum_i e_i^2 - \sum_i \alpha_i\{y_i^{[p]}[w_p^T x_i^{[p]} + b_p] - 1 + \varepsilon_i\} -$$

$$\sum_i \beta_i\{y_i^{[u]}[w_u^T x_i^{[u]} + b_u] - 1 + \varepsilon_i\} - \gamma_3 \sum_{(i,j) \in E_u} \sigma_{ij}[w_u^T x_i^{[u]} - w_u^{[T]} x_j^{[u]}] -$$

$$\gamma_4 \sum_{(i,j) \in E_p} \eta_{ij}[w_p^T x_i^{[p]} - w_p^{[T]} x_j^{[p]}] - \gamma_5 \sum_{(i,u) \in E_{up}} \vartheta_{ij}[w_u^T x_i^{[u]} + b_u - w_p^{[T]} x_j^{[p]} - b_p]$$

where $(i,j) \in E_u$ is the resource utilization relationship between time slot i and j, $(i,j) \in E_p$ is the resource peak value relationship between time slot i and j, $(i,j) \in E_{up}$ is the relationship between resource utilization of $i^{th}$ time slot and resource peak value of $j^{th}$ time slot. All gammas are parameters to tweak with a range of (0,1). All other variables have been previously defined.

In the above equation, the first 6 terms (before $-\gamma_3$ term) describe the utilization and peak value prediction learned by the model. The 7th term ($-\gamma_3$ term) describes the graph constraint relations among utilization. The 8th term ($-\gamma_4$ term) describes the graph constraint relations among peak value. The last term ($-\gamma_5$ term) describes the relationships among two tasks. Although the depicted example uses LS-SVM for performing the joint modeling framework for resource cost estimation, the disclosed embodiments may be easily extended to other types of base machine learning models, such as regression, partial canonical correlation analysis (PCCA), etc.

In addition to joint modeling, the disclosed embodiments may utilize adaptive kernel learning. Currently, existing machine learning technologies in the field select one of the existing kernel methods, with strong data distribution assumption, which may not always be true in real applications. To improve upon the existing technology, the disclosed embodiments utilize an adaptive kernel learning technology that has the capability to learn the most appropriate kernel metrics to various system settings and data, with unknown distribution. In various embodiments, the learnt kernel metric for each system, has the capability to evolve over time based on the continuous collection of the system execution data and based on the fact that the distribution may change over time.

As an example implementation, the disclosed embodiments may utilize a supervised linear kernel for resource related features, where the weights for the features are estimated by aligning the induced weighted kernel to a ground truth kernel that is defined as follows:

$$G(x_i, x_j) = \begin{cases} +1 & \text{if } y_i = y_j \\ -1 & \text{otherwise} \end{cases}$$

where $G(x_i, x_j)$ stands for the ground truth similarity kernel matrix between feature vector xi and xj, where the label of xi is yi, and label of xj is yj; when yi and yj share the same label, $G(x_i, x_j)$ equals to 1, otherwise 0.

Given ground truth kernel G, the equation $K(x, x')=x^T W x'$ is used to best approximate G by finding the weight matrix W that minimizes the following objective function:

$$\mathcal{L} = -\sum_{ij} G_{ij}(XWX^T)_{ij} + \frac{\lambda}{2} W_{ij}^2$$

where the value of objective function L is minimized to find kernel weight matrix W, in which $G_{ij}$ is the ground truth kernel similarity between feature vector xi and xj, X stands for the data matrix in training set, $XWX^T$ stands for the kernel matrix that learnt from the training data, W is the parameter matrix that is learned in order to minimize the difference between ground truth matrix G and learnt matrix $XWX^T$, and λ is the parameter to tweak with a range (0,1).

The first term (before the + operator) is minimized when G and $XWX^T$ are in agreement with each other. The second term (after the + operator) is a regularizer to keep the model parsimonious. The objective function is solved as the following equation:

$$\frac{\partial \mathcal{L}}{\partial W_{pq}} = -\sum_{ij} G_{ij}(X_{ip}X_{qj}^T)_{ij} + \lambda W_{pq} = 0$$

where the left hand side is taking the partial derivative with respect to W, all other variables have been previously defined.

Thus, similarity between any test instance x* to the training instance x is represented by the following equation:

$$K(x,x^*) = \text{sign}(x^T W x^*)$$

where K(x, x*) is the kernel similarity between data feature vector x and x*, sign is the indictor when XTWX*>0, then sign(XTWX*)=1, otherwise 0, x is feature vector in training set, and x* is the feature vector in test set.

A third innovative aspect of the disclosed embodiments involve stacking for a robust system. The existing approach is to train a model on training set, and tweaking the parameter by checking the "change point." However, in a real application, many times the validate error (e.g., for offline training) and test error (e.g., for online testing/applying) are not consistent. A reason for the inconsistency between the offline validate and the online test/apply is the overfitting and concept drift, as well as the strong correlation of base classifier models. To resolve this issue, various embodiments include a stacking technology to leverage the output of diverse base classifier models. This provides a robust system that has consistent validate and test performance. For example, the disclosed embodiments may include a multi-level (deep) a stacking technique with a set of local predictive models with diverse background.

Figure 6:
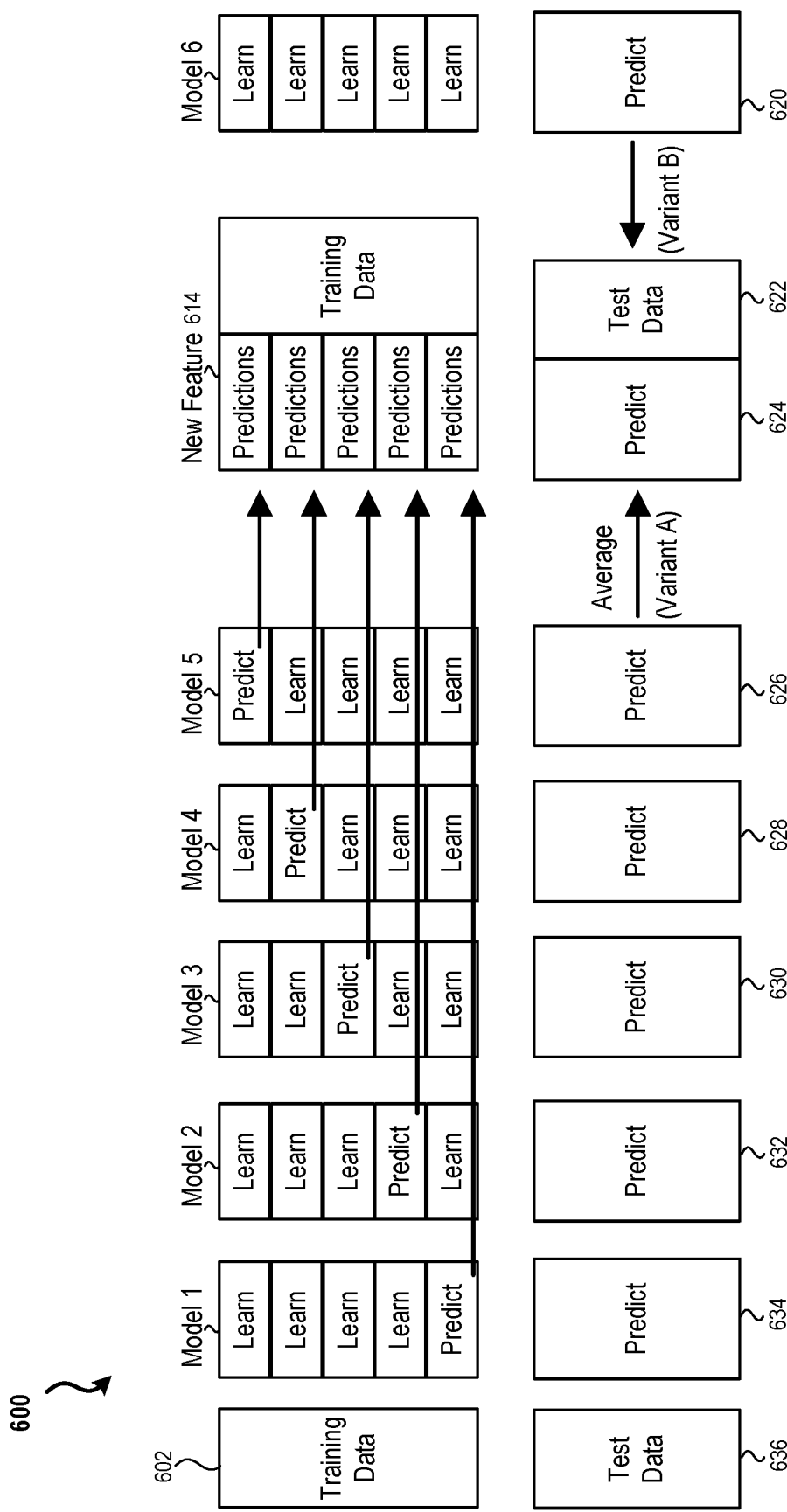
FIG. 6 is schematic diagram of a two level stacking technique in accordance with an embodiment of the present disclosure.

As an example, FIG. 6 is schematic diagram of a two level stacking technique 600 in accordance with an embodiment of the present disclosure. The two level stacking technique 600 provides consistent validate and test performance. In the depicted embodiment, the two level stacking technique 600 employs a five folds stacking technique. In one embodiment, in the first state, the training data 602 is split into five folds and is used to train five models (Model 1, Model 3, Model 3, Model 4, and Model 5) using the leave-one-out strategy (4 folds of data for training purposes and the remaining one fold for predicting). The trained models are also applied to the test data and generate one prediction for each model (labeled as New Feature 614). In one embodiment, three different prediction scores are obtained on the training data 602 of the five models. The prediction scores may each be generated from various predictive models such as, but not limited to, SVM, KCCA, and XGBoosting. In one embodiment, to perform prediction on the test data, the average of the 5 groups of predicted scores from each model is determined. Model 6 comprises the computed averaged prediction scores on the test data for the different predictive models.

For the second stage, the prediction scores 626, 628, 630, 632, and 634 are treated as new training data on a test data 636. In one embodiment, the average of the prediction on the test data from the first state 620 is used as new test data 622. The final results are generated using the new set of training and test data with the predictive model 624. The stacking technique has the advantage in avoiding overfitting due to K-fold cross validation and interpreting non-linearity between features due to treating output as features.

Figure 7:
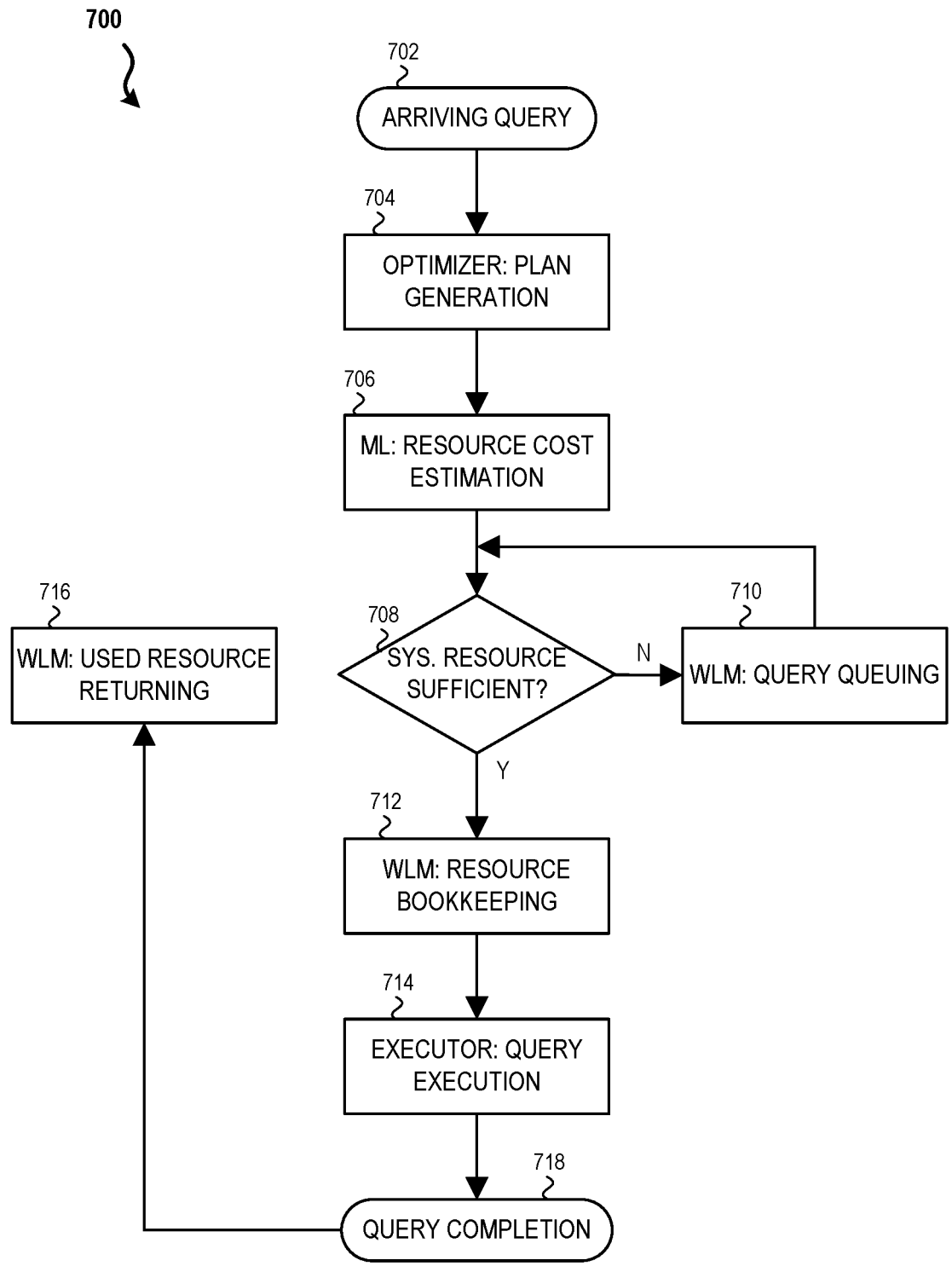
FIG. 7 is a flowchart illustrating a process for query concurrency management flow control in accordance with an embodiment of the present disclosure.

FIG. 7 is a flowchart illustrating a process 700 for query concurrency management flow control in accordance with an embodiment of the present disclosure. The process 700 begins, at block 702, by receiving one or more queries to be executed. In various embodiments, the one or more queries may be received locally or over a network from a single client device or from multiple client devices. A client device is any device that requests execution of a query. At block 704, the one or more queries are passed to a query optimizer for generating a query plan. In one embodiment, the query optimizer generates the query plan by parsing the query into an execution hierarchical tree to determine query operators and their sequential relations or a sequence of the operators and a number of instances of each operator. In one embodiment, each tree node of the execution hierarchical tree represents an operator of the query.

At block 706, the process 700 applies machine learning (ML) to perform resource cost estimation for the query using the trained model and execution plan. In one embodiment, the process 700 at block 706 outputs the estimated resource cost and detected peak values (extreme event) if any. For example, using the innovated technology, the estimated memory costs of the three queries, Q1, Q2, and Q3, are 24 GB, 24 GB and 24 GB, respectively, and are represented as <Q1, 24 GB>, <Q2, 24 GB> and <Q3, 24 GB>.

At block 708, the process 700 determines if there is sufficient system resource available to initiate execution of the query. If the process 700 at block 708 determines that there is sufficient system resource available to initiate execution of the query, the process 700 passes the query to a workload manager (WLM) at block 712 that is configured to perform resource bookkeeping by reducing the current available system resource by the amount of system resource required to perform the query. The process 700 then passes the query to an executor at block 714 that is configured to execute the query. For instance, using as an example a system with 64 GB of available memory and the above estimate memory costs of Q1, Q2, and Q3, when the query Q1 arrives, Q1 is admitted into the database system and starts executing since its memory cost is 24 GB while the system's available memory being of 64 GB because the query's memory cost is less than the available system memory. When Q1 starts executing or prior to, the system available memory is reduced to 40 GB by the workload manager, which handles the resource bookkeeping.

At block 718, the process 700 receives the results of the query when execution of the query is completed. In one embodiment, the process at block 718 returns or transmits the result of the query a client device that requested performance of the query. The process 700, at block 716, returns or frees up the resource used by the query via the WLM. Returning to block 708, if the process 700 at block 708 determines that there is insufficient system resource available to initiate execution of the query, the process 700 passes the query the WLM at block 710 that places the query into a query queue for execution until there is sufficient resource to execute the query. The process 700 repeats for each arriving query.

Additionally, in certain embodiments, the process 700 may be simultaneously processing or managing more than one query at a time. For example, while a query is being executed, the process 700 may begin processing additional queries that it receives. For instance, using the above example, after Q1 begins executing, the process 700 also initiates execution of Q2 as the available memory of the computer system is 40 GB, which is greater than the estimated system memory cost for <Q2, 24 GB>. While Q1 and Q2 are executing, the system has 16 GB of system memory available. Thus, the system's currently available memory of 16 GB is insufficient for initiating execution of Q3, <Q3, 24 GB>, and thus, Q3 is queued in the wait queue to avoid system OOM occurring.

Accordingly, embodiments of the present disclosure provide a co-prediction joint modeling for concurrent query resource utilization and extreme events detection. The disclosed co-prediction framework could be generalized and work with any base machine learning technologies. To solve the problem of data non-linear separable, an adaptive kernel method is provided. The adaptive kernel method automatically learns the most appropriate similarity function/distance metric for given data and system settings. To avoid overfitting and concept drift, a robust machine learning prediction system with a stacking technique is provided.

Advantages and benefits of the disclosed embodiments include, but are not limited to, providing faster and more reliable system performance. For example, severe performance problems, such as OOM, are avoided, system performance becomes smooth and predictable, system resources are better utilized and managed, and resource utilization is improved as query concurrency levels are dynamically adjusted based on query costs. In addition, central processing unit (CPU) and Disk input/output (I/O) resource utilization may also be improved. As a result, embodiments of the present disclosure provide a better customer experience.

Figure 8:
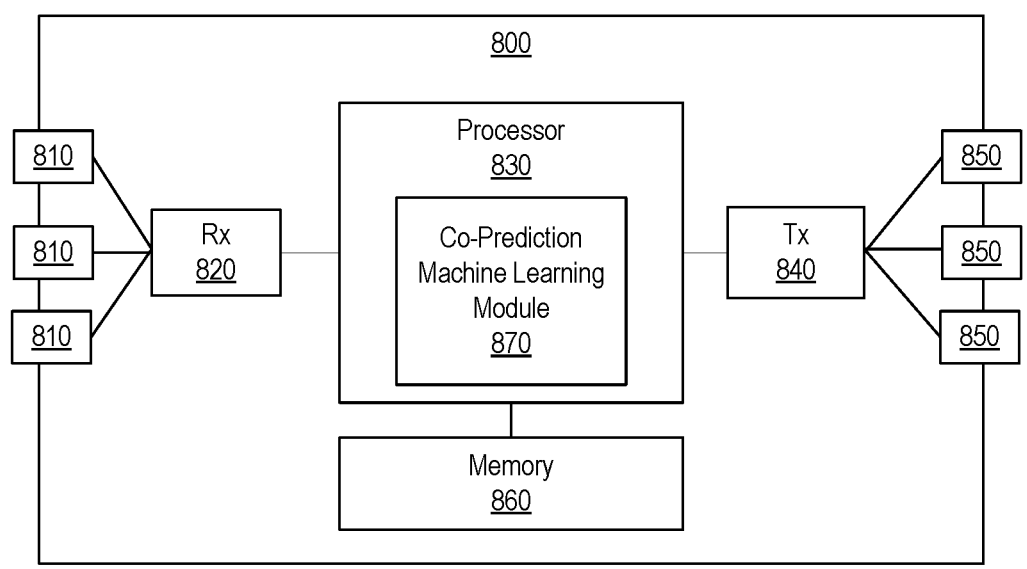
FIG. 8 is a schematic diagram of an apparatus in accordance with an embodiment of the present disclosure.

FIG. 8 is a schematic diagram of a workload management device 800 according to an embodiment of the disclosure. The workload management device 800 is suitable for implementing the disclosed embodiments as described herein. The workload management device 800 comprises ingress ports 810 and receiver units (Rx) 820 for receiving data; a processor, logic unit, or CPU 830 to process the data; transmitter units (Tx) 840 and egress ports 850 for transmitting the data; and a memory 860 for storing the data. The workload management device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a co-prediction machine learning module 870. The co-prediction machine learning module 870 implements the disclosed embodiments described above. For instance, the co-prediction machine learning module 870 implements, processes, prepares, or provides the various functions disclosed herein. The inclusion of the co-prediction machine learning module 870 therefore provides a substantial improvement to the functionality of the workload management device 800 and effects a transformation of the resource management device 800 to a different state. Alternatively, the co-prediction machine learning module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random-access (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for executing queries in a query management device, the method comprising:
   receiving a query from a client device;
   generating a query plan for the query by parsing the query to determine operators of the query and a sequence of the operators;
   generating, by using a machine learning technology configured to automate analytical model building, a predictive trained model;
   predicting a query resource consumption and resource usage extreme events for the query based on the query plan, using the predictive trained model, the predictive trained model being a co-prediction model configured to jointly model the query resource consumption and resource usage extreme events concurrently by taking into account a resource utilization relationship between a first time slot and a second time slot, a resource peak value relationship between the first time slot and the second time slot, and a relationship between resource utilization of the first time slot and resource peak value of the second time slot, the co-prediction model being represented by:

$$\min_{w_u, b_u, e, \beta w_p, b_p, e, \alpha} \mathcal{L}_u = \frac{1}{2} W_p^T W_p + \frac{1}{2} \gamma_2 \sum_i e_i^2 +$$

$$\frac{1}{2} W_u^T W_u + \frac{1}{2} \gamma_1 \sum_i e_i^2 - \sum_i \alpha_i \{y_i^{(p)} [w_p^T x_i^{(p)} + b_p] - 1 + \varepsilon_i\} -$$

$$\sum_i \beta_i \{y_i^{(p)} [w_u^T x_i^{(p)} + b_p] - 1 + \varepsilon_i\} - \gamma_3 \sum_{(i,j) \in E_u} \sigma_{ij} [w_u^T x_i^{(u)} - w_u^{(T)} x_j^{(u)}] -$$

$$\gamma_4 \sum_{(i,j) \in E_p} \eta_{ij} [w_p^T x_i^{(p)} - w_p^{(T)} x_j^{(p)}] - \gamma_5 \sum_{(i,j) \in E_{up}} \vartheta_{ij} [w_u^T x_i^{(u)} + b_u - w_p^{(T)} x_j^{(p)} - b_p]$$

where $(i,j) \in E_u$ is the resource utilization relationship between time slot i and j, $(i,j) \in E_p$ is the resource peak value relationship between time slot i and j, $(i,j) \in E_{up}$ is the relationship between resource utilization of $i^{th}$ time slot and resource peak value of $j^{th}$ time slot;

determining that a currently available system resource is insufficient to initiate execution of the query based on the query resource consumption of the query;

placing the query into a query execution queue in response to the determination that the currently available system resource is insufficient for initiating the execution of the query;

determining that the currently available system resource is sufficient to initiate the execution of the query based on the query resource consumption of the query;

initiating the execution of the query in response to the determination that the currently available system resource is sufficient for initiating the execution of the query;

receiving a result of the query after the execution of the query is completed; and returning the result of the query to the client device.

2. The method of claim 1, further comprising executing the query based on a concurrency query execution plan in response to a determination that the currently available system resource is insufficient for initiating the execution of the query based on the query resource consumption of the query.

3. The method of claim 1, further comprising reducing the currently available system resource by the query resource consumption for the query in response to initiating the execution of the query.

4. The method of claim 1, further comprising increasing the currently available system resource by the query resource consumption for the query in response to completing the execution of the query.

5. The method of claim 1, wherein generating the query plan for the query further comprises parsing the query into an execution hierarchical tree, where each tree node of a plurality of tree nodes of the execution hierarchical tree represents an operator.

6. The method of claim 5, further comprising determining a number of instances each operator, of the determined query operators, appears in the query and a sum of cardinalities for each instance of the number of instances of each operator.

7. The method of claim 1, wherein the machine learning technology utilizes an adaptive kernel that is configured to learn different kernel metrics to various system settings and data.

8. The method of claim 1, wherein the machine learning technology utilizes multi-level stacking technology configured to leverage outputs of diverse base classifier models.

9. A query management device, comprising:
a network communication interface configured to enable communication over a network;
a memory storage comprising instructions; and
one or more processors in communication with the network communication interface and the memory storage, wherein the one or more processors execute the instructions to:
receive a query from a client device;
generate a query plan for the query by parsing the query to determine operators of the query and a sequence of the operators;
wherein the instructions comprise a machine learning technology configured to automate analytical model building:
generate, by using the machine learning technology, a predictive trained model;

predict a query resource consumption and resource usage extreme events for the query based on the query plan, using the predictive trained model, the predictive trained model being a co-prediction model configured to jointly model the query resource consumption and resource usage extreme events concurrently by taking into account a resource utilization relationship between a first time slot and a second time slot, a resource peak value relationship between the first time slot and the second time slot, and a relationship between resource utilization of the first time slot and resource peak value of the second time slot, the co-prediction model being represented by:

$$\min_{w_u,b_u,e,\beta w_p,b_p,e,\alpha} \mathcal{L}_u = \frac{1}{2} W_p^T W_p + \frac{1}{2}\gamma_2 \sum_i e_i^2 +$$

$$\frac{1}{2} W_u^T W_u + \frac{1}{2}\gamma_1 \sum_i e_i^2 - \sum_i \alpha_i \{y_i^{\{p\}}[w_p^T x_i^{\{p\}} + b_p] - 1 + \varepsilon_i\} -$$

$$\sum_i \beta_i \{y_i^{\{p\}}[w_u^T x_i^{\{p\}} + b_p] - 1 + \varepsilon_i\} - \gamma_3 \sum_{(i,j) \in E_u} \sigma_{ij}[w_u^T x_i^{\{u\}} - w_u^{\{T\}} x_j^{\{u\}}] -$$

$$\gamma_4 \sum_{(i,j) \in E_p} \eta_{ij}[w_p^T x_i^{\{p\}} - w_p^{\{T\}} x_j^{\{p\}}] - \gamma_5 \sum_{(i,j) \in E_{up}} \vartheta_{ij}[w_u^T x_i^{\{u\}} + b_u - w_p^{\{T\}} x_j^{\{p\}} - b_p]$$

where $(i,j) \in E_u$ is the resource utilization relationship between time slot i and j, $(i,j) \in E_p$ is the resource peak value relationship between time slot i and j, $(i,j) \in E_{up}$ is the relationship between resource utilization of $i^{th}$ time slot and resource peak value of $j^{th}$ time slot;

determine that a currently available system resource is insufficient to initiate execution of the query based on the query resource consumption of the query;

place the query into a query execution queue in response to the determination that the currently available system resource is insufficient for initiating the execution of the query;

determine that the currently available system resource is sufficient to initiate the execution of the query based on the query resource consumption of the query;

initiate the execution of the query in response to the determination that the currently available system resource is sufficient for initiating the execution of the query;

receive a result of the query after the execution of the query is completed; and return the result of the query to the client device.

10. The query management device of claim 9, wherein the one or more processors further execute the instructions to execute the query based on a concurrency query execution plan in response to the determination that the currently available system resource is insufficient for initiating the execution of the query based on the query resource consumption of the query.

11. The query management device of claim 9, wherein the one or more processors further execute the instructions to reduce the currently available system resource by the query resource consumption for the query in response to initiating the execution of the query.

12. The query management device of claim 9, wherein the one or more processors further execute the instructions to increase the currently available system resource by the query resource consumption for the query in response to completing the execution of the query.

13. The query management device of claim 9, wherein generating the query plan for the query comprises parsing the query into an execution hierarchical tree, where each tree node of a plurality of tree nodes of the execution hierarchical tree represents an operator.

14. The query management device of claim 13, wherein the one or more processors further execute the instructions to determine a number of instances each operator, of the determined query operators, appears in the query and a sum of cardinalities for each instance of the number of instances of each operator.

15. The query management device of claim 9, wherein the machine learning technology utilizes an adaptive kernel that is configured to learn different kernel metrics to various query management device settings and data.

16. The query management device of claim 9, wherein the machine learning technology utilizes multi-level stacking technology configured to leverage outputs of diverse base classifier models.

* * * * *